United States Patent [19]

Kudo et al.

[11] 4,305,910

[45] Dec. 15, 1981

[54] CATALYTIC REACTION FOR REDUCTION OF NITROGEN OXIDE

[75] Inventors: Hiroshi Kudo, Yokohama; Yasuaki Ishida, Tokyo; Shikiho Itaya, Hiroshima; Ryoichi Yamamoto, Yamaguchi, all of Japan

[73] Assignees: Mitsui Engineering and Shipbuilding Co., Ltd.; Mitsui Petrochemical Industries, Ltd., both of Tokyo, Japan

[21] Appl. No.: 223,237

[22] Filed: Jan. 8, 1981

Related U.S. Application Data

[63] Continuation of Ser. No. 15,926, Feb. 28, 1979, abandoned, which is a continuation-in-part of Ser. No. 839,663, Oct. 5, 1977, abandoned.

[51] Int. Cl.³ .......................... F01N 3/15; B01J 8/00; B01J 8/06
[52] U.S. Cl. .................................. 422/179; 422/177; 422/197
[58] Field of Search .............. 422/177, 180, 197, 222, 422/211, 179, 221; 252/477 R

[56] References Cited

U.S. PATENT DOCUMENTS

| | | | |
|---|---|---|---|
| 1,838,105 | 12/1931 | Murray | 122/462 |
| 1,855,165 | 4/1932 | Barker | 422/177 X |
| 1,934,023 | 11/1933 | Wright | 252/477 R X |
| 2,185,931 | 1/1940 | Simpson et al. | 422/201 |
| 2,263,363 | 11/1941 | Menshih | 422/197 |
| 2,709,128 | 5/1955 | Krause | 422/198 X |
| 2,778,610 | 1/1957 | Bruegger | 422/201 X |
| 3,285,713 | 11/1966 | Poehler et al. | 422/197 |
| 3,499,797 | 3/1970 | Hooper | 422/197 X |
| 3,853,485 | 12/1974 | Hogan | 252/477 R |
| 3,915,658 | 10/1975 | Sheitlin et al. | 422/222 |

*Primary Examiner*—Barry Richman
*Attorney, Agent, or Firm*—Koda and Androlia

[57] ABSTRACT

A catalytic reactor for reducing nitrogen oxide ($NO_x$) contained in exhaust gas under the presence of ammonia is provided, wherein tubular catalyst units each being a ring shape in cross-section are disposed in spaced apart relationship from one another in the cross-section of the flow path of the exhaust gas in a manner that tubular axes thereof are in parallel with the direction of gas flow within a reaction vessel through which the exhaust gas containing nitrogen oxide ($NO_x$) and ammonia flows, said catalyst units each being secured to the interior of the reaction vessel at least as two points in the longitudinal direction by support means.

1 Claim, 18 Drawing Figures

CATALYTIC REACTION FOR REDUCTION OF NITROGEN OXIDE

This is a continuation of application Ser. No. 015,926, filed Feb. 28, 1979 and now abandoned, which is in turn a continuation-in-part of application Ser. No. 839,663, filed Oct. 5, 1977 and now abandoned.

BACKGROUND OF THE INVENTION

The present invention relates to a catalytic reaction for reduction of nitrogen oxide (NOx) in exhaust gas. More particularly it relates to said catalytic reaction in which a plurality of tubular catalyst units are arranged in the cross-section of the flow path of a gas flowing thereinto.

Generally, in the heterogeneous gas phase reaction employing a solid catalyst, it is necessary to take the following matters into consideration in order to obtain the highest reaction efficiency using the least amount of catalyst:

(1) The catalyst activity per apparent surface area of the catalyst should be increased.

(2) The apparent surface area of catalyst per unit area thereof should be increased.

As for the methods for achieving the above matters,
(i) the shape of catalyst should be devised; and
(ii) the characteristic particle diameter of catalyst should be minimized as allowable.

(3) The whole of apparent surface of catalyst should be effectively utilized.

Among these three important matters, the item (1) relates to the basic characteristic of catalyst, and concerns the problem of the catalyst itself. On the other hand, the items (2) and (3) relate to how effectively to use such a catalyst, and are important particularly when the catalyst is commercially employed.

Heretofore, in the heterogeneous gas phase reaction, for example, in the sulfuric acid production process using sulfur dioxide converter, the above-mentioned item (2)–(ii) is emphasized, with the result that pellets having as relatively small a size as about 5 mm in diameter and about 10 mm in length have been employed as the catalyst units therefor.

However, in case of denitration of combustion exhaust gases, particularly in case of dry catalytic reduction process therefor, a large amount of powder dust and soot dust, both of which will be hereinafter referred to as dusts, is entrained and deposited on the catalyst surface.

In the above case, if a catalyst unit having a small size as mentioned above is employed, there is raised a problem of masking the surface of the catalyst unit and resultantly clogging the packed catalyst unit bed with dusts. Thus, its solution has been directed to modifying a catalytic reactor. An apparatus for moving bed type, an apparatus for parallel contact of gas flow with catalyst or the like has been proposed, which, however, has resulted in more complicated apparatus and higher cost equipment.

Recently, in order to solve the above-mentioned problem of clogging catalyst unit bed with dusts, a large size of catalyst unit having a large characteristic particle diameter has begun to be employed. As for the solid catalyst employed for the denitration of exhaust gases, particularly for the dry catalytic reduction process therefor, a large size, tubular catalyst unit is being employed, and its dimension is such that the diameter thereof is about scores of mm and the height is about scores to several hundreds mm. Such large size, tubular catalyst units are packed inside a reaction vessel in a stacked manner, and in contact with one another in the cross-section of the flow path of a gas inside a reaction vessel, with the axes thereof being arranged in accord with the flow direction of the gas.

Figure 1:
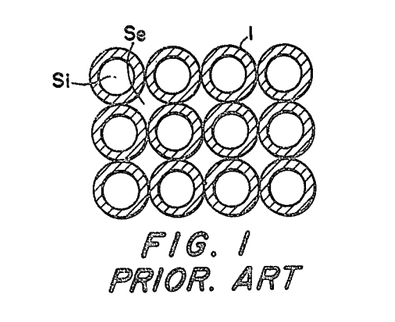
FIGS. 1 and 2 show, as mentioned above, the cross-section of tubular catalyst units in a square pitch arrangement and a triangular pitch arrangement, respectively, in prior art.
Figure 2:
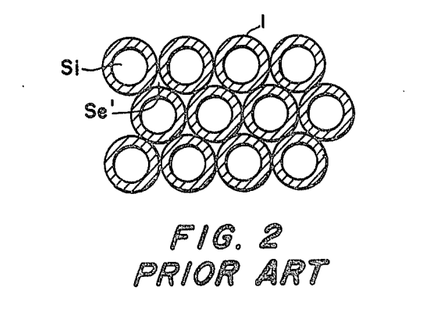

As for the method for arranging such tubular catalyst units, there are exemplified a square pitch arrangement (Japanese Utility Model Publication No. 10455/1975) and a triangular pitch arrangement. In these arrangements, the units are usually stacked concentrically. These arrangements are shown in FIG. 1 and FIG. 2 among the accompanying drawings. FIG. 1 and FIG. 2 show the cross-sectional views of the tubular catalyst units in the case of a square pitch arrangement and in the case of triangular pitch arrangement, respectively. In these figures, reference numeral 1 indicates a tubular catalyst unit.

Since there is a large difference in the flow rate of gas between the flow path through the inside of the tubular catalyst unit (Si in the figures) and the flow path through the outside thereof (Se or Se' in the figures), it has become apparent that various problems are raised.

Assuming that the outer diameter of the tubular catalyst unit is $D_o$, the equivalent diameter of the flow path formed outside the units is represented as $0.27 D_o$ in case of the square pitch arrangement and $0.10 D_o$ in case of the triangular pitch arrangement. The equivalent diameter referred to herein is defined as a value obtained by dividing 4 times the cross-sectional area of the flow path formed by the tubular catalyst units, by their wetted perimeters. In this connection, the equivalent diameter in case of the square pitch arrangement, $4R_{He}$, will be given by the following equation:

$$4R_{He} = \frac{4\left(D_o^2 - \frac{\pi}{4} D_o^2\right)}{\pi D_o} = 0.27 D_o$$

According to the knowledges of hydrodynamics, the ratio of the flow rate of gas inside the tubular catalyst unit to that of gas outside the unit, $Q_{si}/Q_{se}$ is given by the following equation:

$$\frac{Q_{si}}{Q_{se}} = \frac{Si}{Se}\left(\frac{Vi}{Ve}\right) = \frac{Si}{Se}\left(\frac{Di}{4R_{He}}\right)^m$$

wherein $0.5 \leq m \leq 2.0$; $Si$ and $Se$ represent the cross-sectional areas of the flow paths inside and outside the tubular catalyst unit, respectively; $Vi$ and $Ve$ represent the gas flow rates inside and outside the tubular catalyst unit, respectively; $Di$ represents the inner diameter of the tubular catalyst unit, and $4R_{He}$ represents the equivalent diameter of the cross-sectional area of the flow path formed outside the catalyst unit.

As mentioned above, in case of the square pitch arrangement, since $4R_{He}$ is $0.27 D_o$, $Q_{si}$ becomes larger than $Q_{se}$, and this tendency becomes more evident with the decrease in the thickness of the tubular catalyst unit. Taking into consideration the fact that the heterogeneous gas phase reaction occurs on the surface of catalyst units, the flow rates of gas through the inside and outside flow paths, per respective surface areas of the catalyst units will be compared as follows.

The flow rates of gas per the surface area of the tubular catalyst unit, $Q_{si}/A_{si}$ or $Q_{se}/A_{se}$, will be given by the following equations:

$$Q_{si}/A_{si} = Q_{si}/D_i\pi l$$

$$Q_{se}/A_{se} = Q_{se}/D_o\pi l$$

wherein l represents the height of the packed catalyst bed, and $A_{si}$ and $A_{se}$ represent the surface areas in the flow paths inside and outside the tubular catalyst units, respectively.

In this case, since $A_{se}$ is apparently larger than $A_{si}$ and $Q_{si}/A_{si}$ is further larger than $Q_{se}/A_{se}$, the flow rate of gas per unit surface area outside the tubular catalyst units will become very small. Thus, it has become evident that the outer surface of the unit is not effectively utilized.

Further, because of the fact that the flow rate of gas outside the tubular catalyst units becomes smaller, masking of the catalyst surface or clogging of the space outside the units, due to dusts, is liable to occur, which is a serious problem, particularly in case where an exhaust gas including a large amount of dust is treated.

The characteristic particle diameter of the catalyst units necessary for avoiding such masking of catalyst or clogging due to dusts is determined based upon the flow path formed outside the tubular catalyst units, since the cross-sectional area of the flow path formed outside the units is smaller than that of the flow path formed inside the units. Thus, in order to prevent such masking of catalyst or clogging, it may be devised to increase the characteristic particle diameter of the catalyst units to such an extent that the masking or clogging does not occur in the flow path formed outside the tubular catalyst units. In this case, however, the flow path formed inside the units will become further larger than that required for preventing the masking or clogging.

On the other hand, in order to maintain a higher percentage conversion of gas, it is necessary to make use of the catalyst surface more effectively. Thus, a method wherein the surface area of the packed catalyst units per unit volume thereof and the catalyst surface area per unit weight thereof are made larger, i.e. a method wherein the characteristic particle diameter of the catalyst units is made as small as possible, will be advantageous.

In addition, with a fixed bed type catalytic reactor, heretofore it has been known that, identical in surface area outside and inside thereof, a catalyst having honeycomb structure is of a reasonable shape. However, with the catalysts made of such material as $TiO_2$-$V_2O_5$ and $Al_2O_3$-$TiO_2$ which are filled in a reactor for reducing and removing $NO_x$ from the exhaust gas from a combustion equipment such as a boiler, refuse incinerator, cintering furnace, blast furnace and sludge incinerator, there has been encountered a problem of strength, and hence, there has not been manufactured a honeycomb shaped catalyst. Small honeycomb shaped catalyst are used for denitrating the exhaust gas from motor cars. However, large honeycomb shaped catalysts are not to be used for denitrating a large amount of exhaust gas (from scores of thousands to hundreds of thousands m³/hour) exhausted from the combustion equipment described above. Much labor being required for filling in the reactor, small honeycomb shaped catalysts are impracticable for the combustion plants described above.

One object of the present invention is to provide a catalytic reactor for reducing nitrogen oxide ($NO_x$) contained in exhaust gas, wherein inner and outer surfaces of tubular catalyst units are effectively utilized, the catalyst units are protected from being clogged by dust from outside thereof, and packed catalyst units in a reaction vessel can be reduced in weight or volume.

The present invention is intended to provide a catalytic reactor for reducing nitrogen oxide ($NO_x$) contained in exhaust gas, wherein a multiplicity of tubular catalyst units each being a ring shaped in cross-section are disposed in the cross-section of the flow path of the exhaust gas in such a manner that tubular axes thereof are in parallel with the direction of gas flow within a reaction vessel through which the exhaust gas containing nitrogen oxide ($NO_x$) flows, constructed such that said catalyst units are disposed in spaced apart relationship with one another so that the respective equivalent diameter of the cross-sectional areas of the flow pass of gas formed inside and outside the tubular catalyst units per pitch of the tubular catalyst units can be made nearly equal and said catalyst units are each secured to the interior of reaction vessel at least at two points in the longitudinal direction by support means.

BRIEF DESCRIPTION OF THE DRAWINGS

The present invention will be more fully understood from the following description taken in conjunction with the accompanying drawings in which.

DETAILED DESCRIPTION OF THE INVENTION

Figure 3:
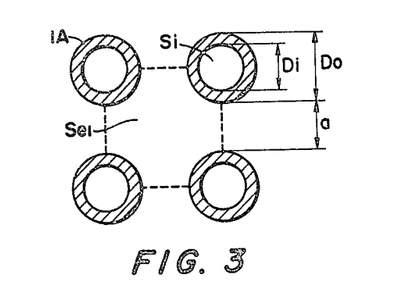
FIG. 3 shows the cross-section of tubular catalyst units arranged in the square pitch arrangement.
Figure 4:
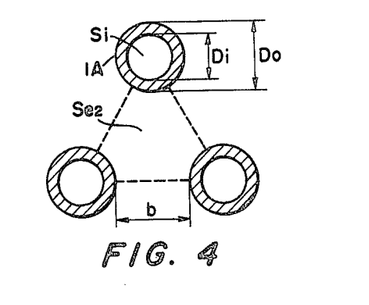
FIG. 4 shows the cross-section of tubular catalyst units arranged in the triangular pitch arrangement.

In FIGS. 3 and 4 symbol 1A shows a tubular catalyst unit having a cross-section of ring form; Si shows the flow path of gas inside the tubular catalyst unit; $Se_1$ and $Se_2$ show the flow path of gas outside the tubular catalyst unit, respectively; $D_i$ and $D_o$ show the inner diameter and the outer diameter of the tubular catalyst unit, respectively; a and b show the spacing of the tubular catalyst unit having a cross-section of ring form in case of the square pitch arrangement and in case of the triangular pitch arrangement, respectively.

The tubular catalyst unit of being a ring shape in cross-section is prepared by a conventional method, for example, by shaping a catalytic material such as $TiO_2$-$V_2O_5$ or $Al_2O_3$-$TiO_2$ itself or a mixture of catalytic material and carrier to a tubular form. The catalytic material may be deposited on a carrier of a tubular form.

The general ranges of the dimensions of the tubular catalyst unit of the present invention can be illustrated by the following equations, wherein $D_o$ and $D_i$ show the outer diameter and the inner diameter of the tubular catalyst unit, respectively, and l shows the length of the catalyst unit.

$$10 \text{ mm} \leq D_o \leq 200 \text{ mm}$$

$$2 \text{ mm} \leq D_i \leq 200 \text{ mm}$$

$$5 \text{ mm} \leq l \leq 3000 \text{ mm}$$

$$1.4 < D_i/D_o < 1.0$$

The above-mentioned tubular catalyst units are arranged spaced usually at an equal pitch and in a square or triangular pitch arrangement in the cross-sectional area of the flow path of the gas passing through a reaction vessel.

The tubular catalyst units are disposed in spaced apart from one another so that the respective equivalent diameters of the cross-sectional areas of the flow paths of gas formed inside and outside the catalyst units per pitch of the catalyst units can be made nearly equal. Referring to the Drawings, the catalyst units are each arranged with such a spacing a or b as shown in FIG. 3 or FIG. 4 that the respective equivalent diameters of the cross-sectional areas of the flow paths Si and $Se_1$ or $Se_2$ can be nearly equal. The allowable range of the spacing a or b is from 0.9 to 1.2 times the spacing in cases where the respective equivalent diameters are substantially equal. When support wires such as steel wires are used, since the flow path outside the tubular catalyst units is slightly decreased, the spacing a or b is 1.1 to 1.2 times the spacing where the respective equivalent diameters of the cross-section areas of the flow path Si and $Se_1$ or $Se_2$ can be equal.

In case of the above-mentioned arrangement, the respective flow rates of gas per catalyst surface areas inside and outside the tubular catalyst units are calculated as follows:

(A) In case of the square pitch arrangement:

The equivalent diameter $4R_{He}$ of the cross-section of the flow path of gas formed outside the tubular catalyst units is expressed by the following formula:

$$4R_{He} = \frac{4\left\{(D_o + a)^2 - \frac{\pi}{4}D_o^2\right\}}{\pi D_o}$$

From this formula, the following spacing a where $4R_{He}$ equals to $D_i$ is sought:

$$a = \frac{1}{2}\{\pi D_o(D_i + D_o)\}^{\frac{1}{2}} - D_o$$

In this case, since the respective equivalent diameters of the flow paths of gas inside and outside the tubular catalyst units become equal, the respective flow rates of the flow paths inside and outside the tubular catalyst units become equal. Namely, $$V_i/V_e = (D_i/4R_{He})^m, \quad 0.5 \leq m \leq 2.0$$

$$V_i = V_e$$

Therefore, the flow rates of gas in the flow paths inside and outside the tubular catalyst units, per the respective catalyst surface areas are expressed as follows:

Flow rate of gas in the flow path inside the tubular catalyst units:

$$\pi/4 D_i^2 \cdot V_i$$

Surface area of the tubular catalyst units in the flow path inside the tubular catalyst units: $\pi D_i l$ (wherein l means the height of catalyst bed)

Flow rate of the gas per the above surface area:

$$\pi/4 D_i^2 V_i / \pi D_i l = \frac{1}{4} D_i V_i / l$$

On the other hand, flow rate of gas in the flow path outside the tubular catalyst units:

$$\{(D_o+a)^2 - (\pi/4)D_o^2\}V_e$$

Surface area in the flow path outside the tubular units: $\pi D_o l$ (wherein l means the height of catalyst bed)

Flow rate of gas in the flow path outside the tubular catalyst units:

$$\left\{(D_o + a)^2 - \frac{\pi}{4}D_o^2\right\} V_e/\pi D_o l$$

$$= \tfrac{1}{4} D_i V_e / l$$

$$= \tfrac{1}{4} D_i V_i / l$$

Thus, the flow rates of gas in the flow paths Si and Se₁ inside and outside the tubular catalyst units per respective surface areas thereof become equal. When the flow rate of gas become equal, the percentages conversion in the flow paths inside and outside the units also become equal.

(B) In case of the triangular pitch arrangement:

The equivalent diameter $4R'_{He}$ of the cross-section of the flow path of gas formed outside the tubular catalyst units is expressed by the following equation:

$$4R'_{He} = 4 \left( \frac{\sqrt{3} (D_o + b)^2 - \tfrac{\pi}{4} D_o^2 \cdot \tfrac{1}{2}}{\tfrac{1}{2} \pi D_o} \right)$$

From this equation, the following spacing b is sought:

$$b = \left( \frac{1}{2\sqrt{3}} \pi D_o (D_i + D_o) \right)^{\tfrac{1}{2}} - D_o$$

In this case, since the respective equivalent diameters of the flow paths of gas inside and outside the tubular catalyst units become equal, the respective flow rates $V_i$ and $V_e'$ of the flow paths inside and outside the tubular catalyst units become equal. ($V_i = V_e'$).

Then, the flow rate of gas in the flow paths inside and outside the tubular catalyst units, per the respective surface areas thereof are expressed as follows:

Flow amount of gas in the flow path inside the tubular catalyst units: $\pi/4 \, D_i^2 \cdot V_i$ Surface area of the tubular catalyst units in the flow path inside the tubular catalyst units: $\pi D_i l$ Flow rate of gas per the above surface area:

$$\tfrac{\pi}{4} D_i^2 V_i / \pi D_i l = \frac{D_i V_i}{4l}$$

On the other hand, flow rate of gas in the flow path outside the tubular catalyst units:

$$\left\{ \sqrt{3} (D_o + b)^2 - \tfrac{\pi}{4} D_o^2 \cdot \tfrac{1}{2} \right\} V_e'$$

Surface area of the tubular catalyst units in the flow path outside the tubular catalyst units: $\tfrac{1}{2} \pi D_o l$ Flow rate of gas in the flow path outside the tubular catalyst units:

$$\left\{ \sqrt{3} (D_o + b)^2 - \tfrac{\pi}{4} D_o^2 \cdot \tfrac{1}{2} \right\} V_e' / \tfrac{1}{2} \pi D_o l$$

$$= \frac{\left\{ \sqrt{3} (D_o + b)^2 - \tfrac{\pi}{4} D_o^2 \cdot \tfrac{1}{2} \right\}}{\tfrac{1}{2} \pi D_o} \cdot \frac{V_e'}{l}$$

$$= \frac{D_i V_i}{4l}$$

Thus, the flow rates of gas in the flow paths Si and Se₂ inside and outside the tubular catalyst units, per the respective surface areas thereof become equal, and hence the percentages conversion in the flow paths inside and outside the units also become equal.

By disposing tubular catalyst units in a reaction vessel in such a manner as described above, the flow path of gas formed outside the tubular catalyst units, having a small equivalent diameter and hence causing masking of the flow path due to dust contained in exhaust gas, as seen in the conventional tight close contact of the catalyst units is improved, and it is possible to select rationally the characteristic particle diameter of the tubular catalyst units, depending upon the quality and amount of dust contained in exhaust gas. In other words, it is possible to rationally define the cross-section areas of the flow paths inside and outside the tubular catalyst units, and select the smallest characteristic particle diameter of the tubular catalyst units. Since the inner and outer surfaces of the tubular catalyst units are utilized as equivalently as possible, the utilization extent of the catalyst units surfaces are greatly improved as a whole.

As a result, (i) it is possible to reduce the total weight of the packed catalyst units bed in the reactor;

(ii) it is possible to reduce the total volume of the packed catalyst units bed in the reactor; and (iii) since the utilization extents of the surfaces of the catalyst units become nearly equal, the change with time of each portion of the packed catalyst units also becomes nearly equal, and hence it is possible to determine the initial amount of the catalyst units to be packed properly.

The above-mentioned effectivenesses are important in that, in the plant for denitrating exhaust gases, particularly in the plant according to dry catalytic reduction process, it is possible to reduce the initial cost and the running cost of the plant where the cost of the catalyst or the cost of a catalytic reactor occupy the large portion thereof.

In order to support the catalyst units spaced apart from one another the catalyst units may be supported by the wire stretched across the cross-section of the reaction vessel, or the ends of the catalyst units may be held by appropriate supporters in the reaction vessel.

Figure 5:
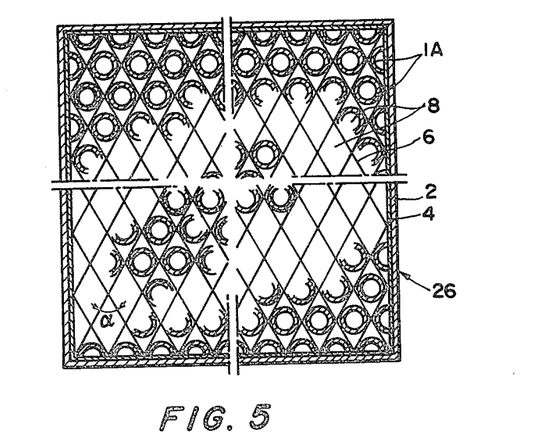
FIG. 5 is a cross-sectional view showing the catalytic reactor wherein catalyst units are secured to the interior of the reaction vessel by support means according to the present invention.
Figures 6, 7, 8:
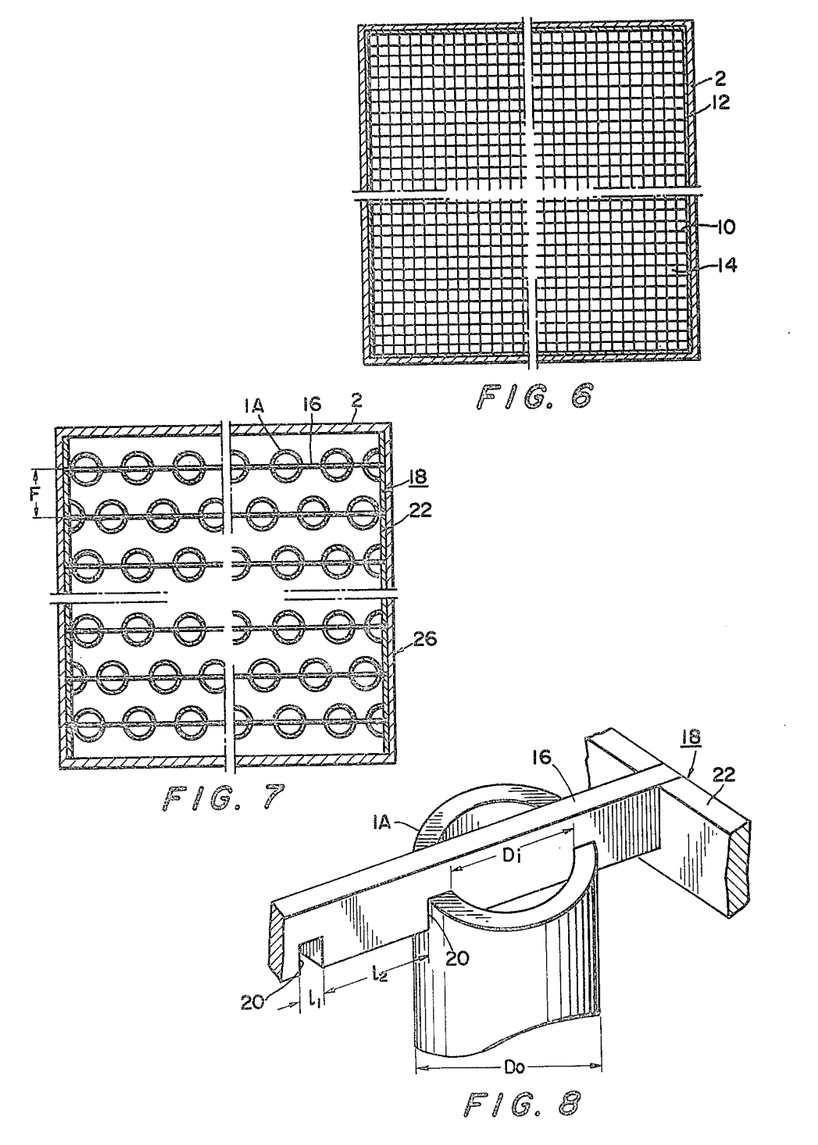
FIG. 6 is a plan view showing the support frame for the catalyst unit arbitrarily usable in the reaction vessel.
FIG. 7 is a cross-sectional view showing the catalytic reactor wherein the catalyst units are secured to the interior of the reaction vessel by support means different from the aforesaid one.
FIG. 8 is a partial oblique view showing the details of the support means of the catalyst unit as shown in FIG. 7.

FIG. 5 is a cross-sectional view showing a catalytic reactor wherein the support means for securing the tubular catalyst units to the interior of the reaction vessel according to the present invention. Wires 6 made of stainless steel and stretched across a support frame 4 in a manner to form rhombic meshes 8. Said support frame 4 has dimensions fit for the cross-section of the flow path of gas in the reaction vessel 2, and is adapted to be secured to the reaction vessel 2. Said meshes 8 each have dimensions for receiving a tubular catalyst unit 1A. Such support frames having the wire net are provided spaced in the direction of gas flow in the reaction vessel in a manner to support at least the opposite end portions of the tubular catalyst unit 1A. An angle α made by the wires 6 is 60° in the case the catalyst units are in the triangular pitch arrangement. However, the angle is 90° in the case the catalyst units are in a square pitch arrangement. In the above embodiment, single wires 6 are used. However, in the case the catalyst units are widely spaced apart one another, double wires which are slightly spaced apart from each other may be used. Additionally, the catalyst units may be inserted into every second mesh, leaving some meshes unused. To prevent the catalyst units 1A from falling off downward, a frame 12 stretchingly provided with fine wire net 10 may disposed downwardly of the catalyst units 1A in the reaction vessel 2 as shown in FIG. 6. The size of a mesh 14 of said wire net 10 may be less than the outer diameter of the catalyst unit 1A and such that the catalyst unit 1A does not fall off from the mesh 14.

FIG. 7 is a cross-sectional view of the catalytic reaction vessel in explanation of another support means for supporting the tubular catalyst units in said vessel according to the present invention. In this embodiment, a plurality of support members 18, wherein a multiplicity of grooved flat belt shaped plates 16 are parallelly provided, are disposed in the direction of gas flow and in spaced apart relationship from one another within the reaction vessel 2, in such a manner that the opposite ends of the catalyst unit 1A being of a ring shape in cross-section are coupled into grooves 20 of said flat belt shaped plates as shown in FIG. 8, so that the catalyst units 1A can be supported in a triangular pitch arrangement. The groove 20 of the flat belt shaped plate 60 has a width $l_1$ slightly larger than the thickness of the catalyst unit 1A as shown in FIG. 8, and the interval $l_2$ between the grooves is determined in accordance with the ways of arrangement of the catalysts (triangular or square). The depth of the groove 20 may be such that the catalyst unit can be satisfactorily secured. The support member 18 has a member 22 which supports said grooved flat belt shaped plate 16 in a manner that the interval between the adjacent flat belt shaped plates is F, and said member 22 is secured to the wall of the reaction vessel 2. In addition, the other end of the catalyst unit is supported likewise. The parts constituting the support member 18 is made of a material excellent in heat resistance and corrosion resistance such as stainless steel. With the arrangement as described above, the catalyst unit 1A is supported at least at opposite ends thereof by the support members 18, thereby being secured to the interior of the reaction vessel 2.

The embodiment shown in FIG. 7 is the case where the rows of the catalyst units 1A are shifted by ½ pitch from one another so as to be disposed in a triangular pitch arrangement. However, the rows of the catalyst units 1A may have the pitch identical with one another so as to be disposed in a square pitch arrangement. Additionally, it is possible to dispose the catalyst units in the reaction vessel not only in the vertical but also in the horizontal direction. The catalyst units may be packed by using said supporting means inside the reaction vessed in serially aligned and stacked manner and in parallel to the flow direction of gas.

As mentioned above, the tubular catalyst units are either inserted into and supported by the meshes of steel wire nets stretchingly provided across the cross-section of the flow path of gas and in spaced apart relationship from each other in the reaction vessel or supported at the opposite ends thereof by said support means, so that the catalyst units can be correctly held in relative positions and in spaced apart relationship from one another, and moreover, the arrangement of the catalyst units can be facilitated.

The present invention will be illustrated by way of the following Examples, which, however, are not intended to limit the scope of the present invention.

EXAMPLE 1

Dry denitration with ammonia, of an exhaust gas containing nitrogen oxide ($NO_x$), was carried out in a catalytic reactor packed with the tubular catalyst units having ring cross-section, spaced apart from one another as shown in FIG. 3 or FIG. 4, and the weight and volume of the packed catalyst unit bed giving the same percentage conversion (90.0%) at the same pressure loss were calculated.

Figure 9:
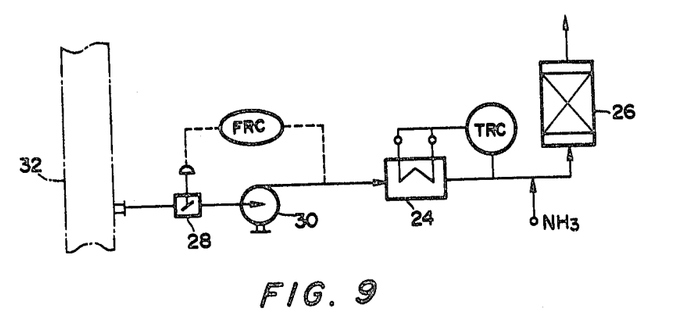
FIG. 9 is a schematic flow diagram illustrating a plant for a denitration process for exhaust gases, including a catalytic reactor wherein the arrangement of the catalyst units of the present invention is employed.

FIG. 9 shows a schematic flow diagram of the above experiments. In this figure, a nitrogen oxide containing exhaust gas flowing through a flue 32 is sucked by a blower 30 and flows into a heater 24 where the gas is heated to a given temperature. The gas thus heated is added a given amount of ammonia and the resulting mixture is sent to a catalytic reactor 26. The amount of gas sucked is automatically controlled to a given amount by a blower suction damper 28 connected with FRC (Flow Controller), and also the exit temperature of the exhaust gas at the heater 24 is automatically controlled to a given temperature by TRC (Temperature Controller).

Inside the catalytic reactor 26, tubular catalyst units having a dimension of $D_o$, 33.0 mm, $D_i$, 23.0 mm and l, 300 mm were arranged in a square or triangular pitch arrangement with spacing a or b shown in FIG. 3 or FIG. 4, having the respective values varied, and the catalyst units were fixed by support means as shown in FIG. 5 or FIG. 7.

The reaction conditions in the catalytic reactor were as follows:

| Flow rate of gas: | 200 Nm³/Hr. | |
|---|---|---|
| Gas composition: | $CO_2$ | 13.0 vol. % |
| | $O_2$ | 2.0 vol. % |
| | $H_2O$ | 14.0 vol. % |
| | $NO_x$ | 200 ppm |
| | $SO_x$ | 1000 ppm |
| | $N_2$ | balance |
| dust: | 200 mg/Nm³ . dry | |
| Reaction temperature: | 350° C. | |
| Ratio of ammonia added: | 1:1 (by mol) based on the amount of $NO_x$ at inlet | |

The results in the case of the square pitch arrangement of the tubular catalyst units are shown in Table 3, and the results in the case of the triangular pitch arrangement thereof are shown in Table 4.

TABLE 3

| | Spacing a | | | | | | | | | |
|---|---|---|---|---|---|---|---|---|---|---|
| | 0 | 2 | 4 | 6 | 8 | 10 | 12 | 14 | 16 | 18 |
| Percentage denitration (%) | 90.0 | 90.0 | 90.0 | 90.0 | 90.0 | 90.0 | 90.0 | 90.0 | 90.0 | 90.0 |
| Pressure loss Δ p (mm $H_2O$) | 100.0 | 100.0 | 100.0 | 100.0 | 100.0 | 100.0 | 100.0 | 100.0 | 100.0 | 00.0 |
| Height of packed catalyst unit bed (m) | 3.6 | 3.2 | 3.3 | 3.9 | 4.7 | 5.5 | 6.4 | 7.4 | 8.6 | 9.9 |
| L V (m/sec)* | 8.2 | 9.6 | 10.9 | 11.9 | 12.8 | 13.3 | 13.7 | 13.9 | 14.1 | 14.3 |
| S V ($Hr^{-1/}$)** | 3640 | 4700 | 5200 | 4800 | 4280 | 3800 | 3360 | 2980 | 2580 | 2280 |
| Total volume of packed catalyst unit bed (l) | 54.9 | 42.5 | 38.5 | 41.7 | 46.7 | 52.6 | 59.5 | 67.1 | 77.5 | 87.7 |
| Total weight of packed catalyst unit bed (Kg) | 31.3 | 21.5 | 17.4 | 17.0 | 17.2 | 17.7 | 18.2 | 18.6 | 20.0 | 21.0 |

TABLE 3-continued

| | Spacing a | | | | | | | | | |
|---|---|---|---|---|---|---|---|---|---|---|
| | 0 | 2 | 4 | 6 | 8 | 10 | 12 | 14 | 16 | 18 |
| Apparent density of packed catalyst unit bed (Kg/m³) | 570 | 507 | 453 | 408 | 369 | 336 | 306 | 281 | 258 | 239 |

*Linear velocity
**Space velocity of gas

TABLE 4

| | Spacing b | | | | | | | | | |
|---|---|---|---|---|---|---|---|---|---|---|
| | 0 | 2 | 4 | 6 | 8 | 10 | 12 | 14 | 16 | 18 |
| Percentage denitration (%) | 90.0 | 90.0 | 90.0 | 90.0 | 90.0 | 90.0 | 90.0 | 90.0 | 90.0 | 90.0 |
| Pressure loss Δ p (mm H₂O) | 100.0 | 100.0 | 100.0 | 100.0 | 100.0 | 100.0 | 100.0 | 100.0 | 100.0 | 100.0 |
| Height of packed catalyst unit bed (m) | 3.7 | 3.7 | 3.5 | 3.4 | 3.5 | 3.8 | 4.4 | 5.1 | 5.8 | 6.8 |
| L V (m/sec) | 6.6 | 8.1 | 9.3 | 10.4 | 11.4 | 11.9 | 12.3 | 12.7 | 13.0 | 13.3 |
| S V (Hr⁻¹) | 2850 | 3500 | 4180 | 4820 | 5200 | 4890 | 4370 | 3910 | 3520 | 3090 |
| Total volume of packed catalyst unit bed (l) | 70.2 | 57.1 | 67.8 | 41.5 | 38.5 | 40.9 | 45.8 | 51.2 | 56.8 | 64.7 |
| Total weight of packed catalyst unit bed (Kg) | 46.1 | 33.3 | 25.0 | 19.5 | 16.4 | 15.8 | 16.2 | 16.5 | 16.9 | 17.8 |
| Apparent density of packed catalyst units bed (Kg/m³) | 656 | 583 | 522 | 470 | 425 | 386 | 353 | 323 | 298 | 275 |

Figure 10:
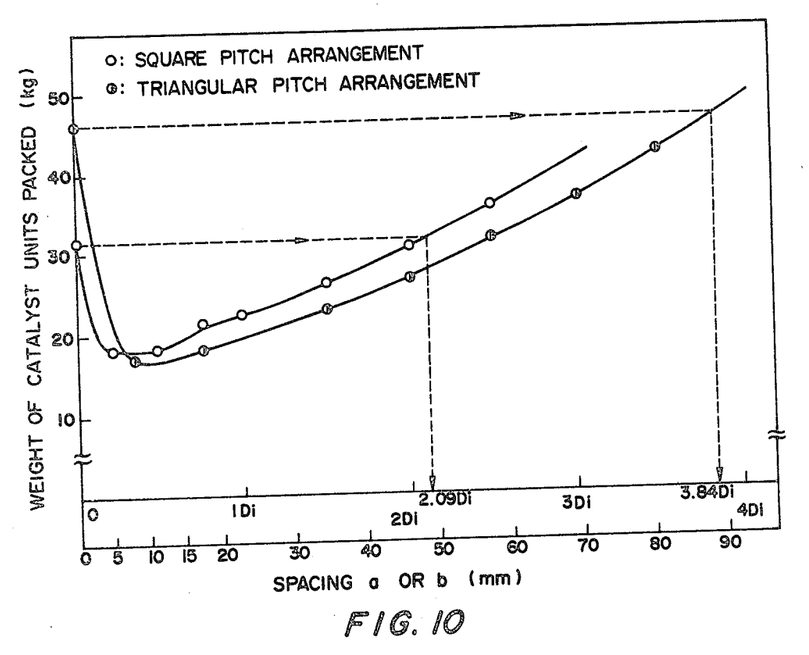
FIG. 10 shows the relationship between the spacing of the catalyst units and the weight of the catalyst units packed in the catalytic reactor of FIG. 7 so as to achieve the same percentage conversion at the same pressure loss.
Figure 11:
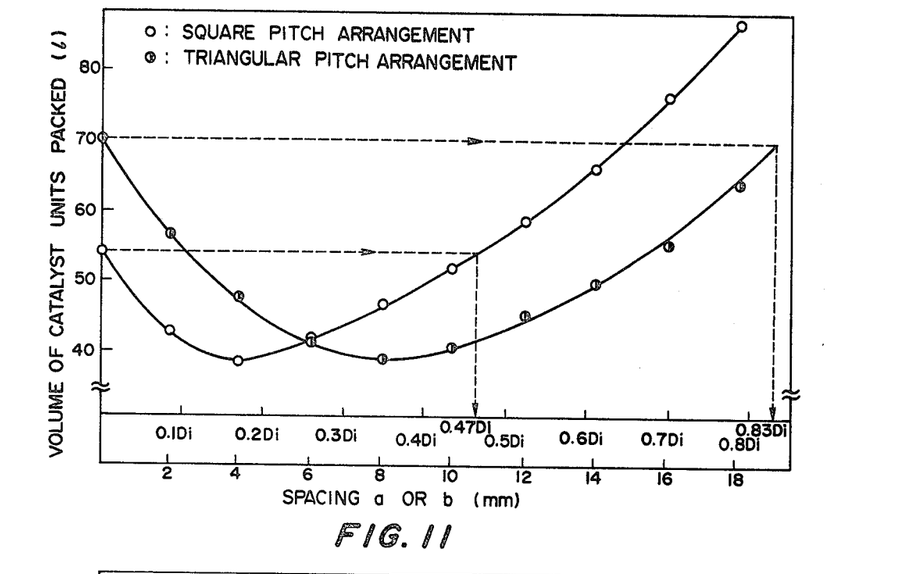
FIG. 11 shows the relationship between the spacing of the catalyst units and the volume of the catalyst units packed in the catalytic reactor of FIG. 7, so as to achieve the same percentage conversion at the same pressure loss.

The relationship between the weight of packed catalysts bed and the volume of packed catalysts bed, relative to the catalyst spacing in case where the same percentage denitration is attained at the same pressure loss based upon the results of the above experiment, is shown in FIGS. 10 and 11.

From the above-mentioned experimental results (FIGS. 10 and FIG. 11), it is apparent that the optimum values of the spacing a and b of the tubular catalyst units are in the range of a = 3–6 mm (0.13 $D_i$–0.26 $D_i$) in case of the square pitch arrangement, and in the range of b = 7–9 mm (0.30 $D_i$–0.39 $D_i$) in case of the triangular pitch arrangement, respectively.

These values are nearly in accord with the theoretical spacings making equal the equivalent diameters of the cross-sections of the flow paths inside and outside the tubular catalyst units, i.e.

a = 5.1 mm (0.22 $D_i$) in case of the square pitch arrangement, and b = 8.0 mm (0.35 $D_i$) in case of the triangular pitch arrangement. Thus it has been experimentally confirmed that if the tubular catalyst units are arranged so that the equivalent diameters of the cross-sections of the flow paths inside and outside the tubular catalyst units can be made nearly equal, then it is possible to minimize the weight and volume of packed catalyst units bed.

EXAMPLE 2

Dry denitration with ammonia, of an exhaust gas containing nitrogen oxide ($NO_x$) was carried out employing a catalytic reactor packed with the tubular catalyst units having ring cross-section in contact with one another or spaced in a triangular pitch arrangement.

The flow diagram of this experiment is the same as shown in FIG. 9 except that a pair of catalytic reactors A and B have been employed. Tubular catalyst units having ring cross-section ($D_o$ = 20.0 mm, $D_i$ = 14.0 mm, l = 500 mm) were packed in the catalytic reactor A in a triangular pitch arrangement spaced at the interval of 4.8 mm which is the value making the respective equivalent diameters of the cross-sectional areas of the gas flow paths inside and outside of the tubular catalyst units equal. The same tubular catalyst units as mentioned above were also packed in contact with one another in a triangular pitch arrangement inside the catalytic reactor B. The catalyst tubular unit is composed of $V_2O_5$ and a carrier.

The conditions of the exhaust gas were as follows.

| Flow rate of gas: | 2000 Nm³/Hr. |
|---|---|
| Gas composition: | $CO_2$ 13.0 vol. % |
| | $O_2$ 3.0 vol. % |
| | $H_2O$ 11.0 vol. % |
| | $NO_x$ 200 ppm |
| | $SO_x$ 1400 ppm |
| | $N_2$ balance |
| dust: | 400 mg/Nm³ . dry |
| Reaction temperature: | 350° C. |

The specifications of the catalytic reactors A and B were shown in Table 8.

TABLE 8

| | Reactor A | Reactor B |
|---|---|---|
| Diameter of the reactor (Square type) (mm) | 400 | 400 |
| Height of the tubular catalyst unit bed (m) | 2.14 | 3.53 |
| S V (Hr.⁻¹) | 5840 | 3540 |
| L V (m/sec.) | 8.0 | 8.0 |
| Intial pressure loss Δ p (mm H hd 2O) | 62 | 135 |
| Initial percentage denitration η (%) | 90.0 | 90.0 |
| Percentage spacing of the catalyst unit bed (%) | 70 | 54 |
| Volume of tubular catalyst unit bed (M³) | 0.342 | 0.565 |
| Volume of tubular catalyst units (m³) | 0.103 | 0.260 |

Linear velocity (LV) of gas and initial percentage denitration η were controlled to the same value in the reactor A and B respectively in order to compare the dust proof property thereof, and the change of percentage denitration and pressure loss with time were observed. The results are shown in FIG. 12.

Figure 12:
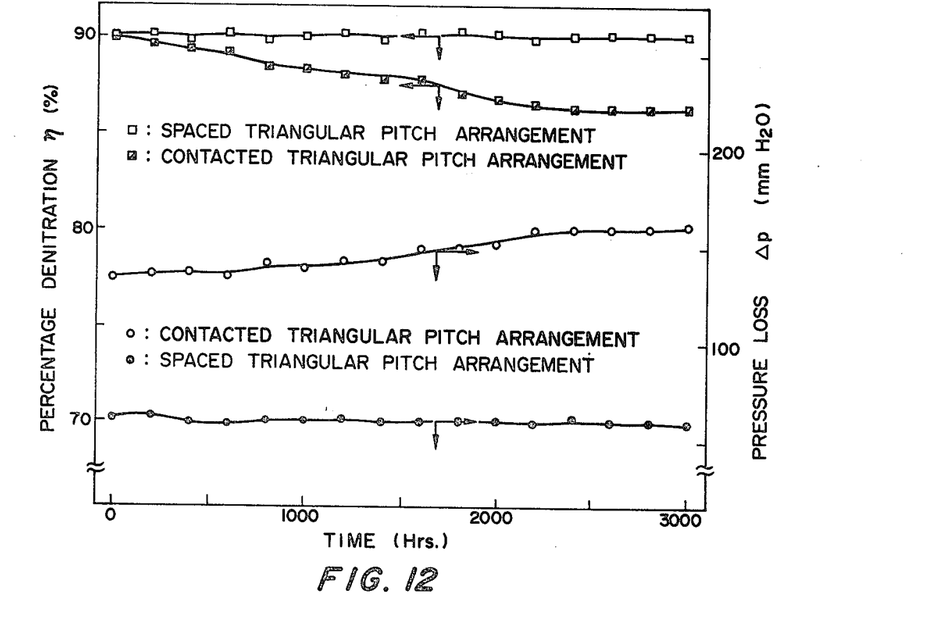
FIG. 12 shows the relationship between the percentage denitration of an exhaust gas or the pressure loss in a catalytic reactor and the reaction time in the example of the present invention.

As shown in FIG. 12, percentage denitration η and pressure loss Δp did not change over 3000 hours in case of the spaced triangular pitch packing. However, in case of the close contact packing, η was decreased and Δp was increased.

After the completion of the above experiments, clogging of dust outside the tubular catalyst units was observed in the reactor B and the outer surface of the tubular catalyst units did not seem to contribute to denitration.

Further, changes with time of denitration calculated assuming that the decrease in percentage denitration was due to the clogging outside the tubular catalyst units, was accord well with the experimental data of FIG. 12. As described above, it is apparent that the spaced packing of the present invention is superior in dust-proof property to the close contact packing of the prior art.

In FIGS. 13A, 13B, 13C, 14A, 14B and 14C, symbols 1B, 1C, 1D and 1E show a tubular catalyst unit provided with fins, respectively; Si shows the flow path of gas inside the tubular catalyst unit; $Se_1$, $Se_2$, $Se_3$ and $Se_4$ show the flow path of gas outside the tubular catalyst unit, respectively; $D_i$ and $D_o$ show the inner diameter and the outer diameter of the tubular catalyst unit, respectively; a and b show the spacing of the tubular catalyst unit having a cross-section of ring form for the case of the square pitch arrangement and for the case of the triangular pitch arrangement, respectively; X and Y show the radial length of fin of the tubular catalyst unit provided with fins for the case of the square pitch arrangement and for the case of the triangular pitch arrangement, respectively; and $t_1$ and $t_2$ show the thickness of fin of the tubular catalyst unit provided with fins for the case of the square pitch arrangement and for the case of the triangular pitch arrangement, respectively.

Figure 13A:
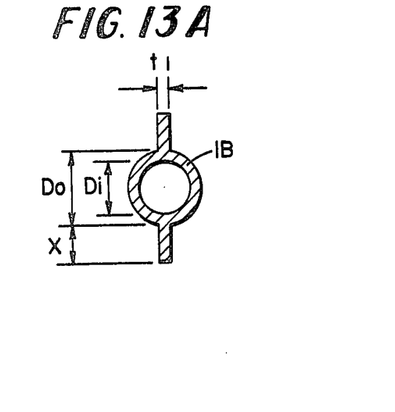
FIG. 13A shows the cross-section of an embodiment of one tubular catalyst unit having fins on the surface thereof employed in a square pitch arrangement of tubular catalyst units.
Figure 13B:
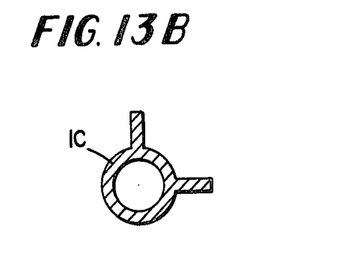
FIG. 13B shows the cross-section of another embodiment of one tubular catalyst unit having fins on the surface thereof employed in a square pitch arrangement of tubular catalyst units.
Figure 13C:
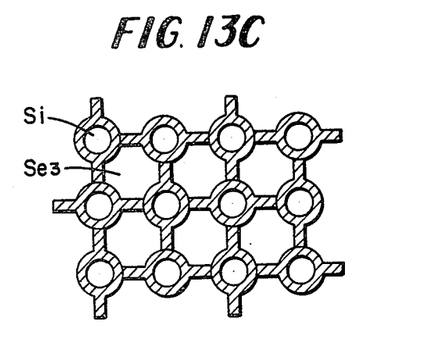
FIG. 13C shows the cross-section of tubular catalyst units arranged in a square pitch arrangement, each catalyst unit being of the type of FIG. 13A.
Figure 14A:
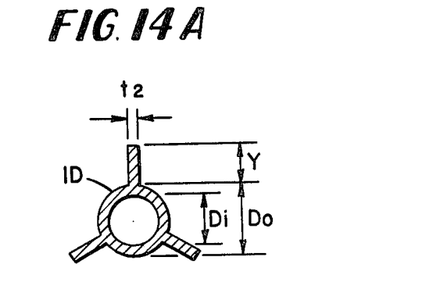
FIG. 14A shows the cross-section of one tubular catalyst unit having fins on the surface thereof employed in the triangular pitch arrangement.
Figure 14B:
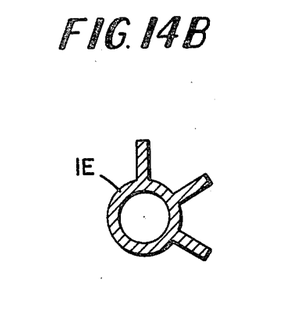
FIG. 14B shows the cross-section of another embodiment of the tubular catalyst unit having fins on the surface thereof employed in the triangular pitch arrangement.
Figure 14C:
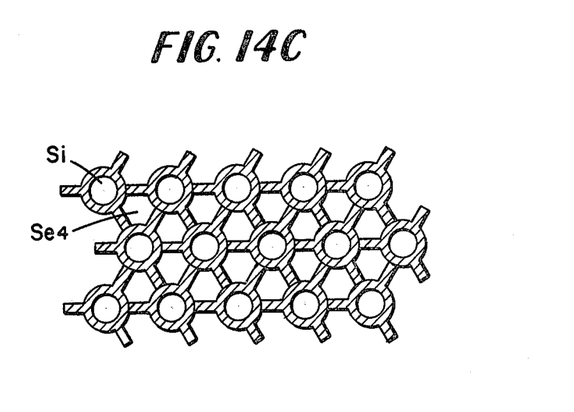
FIG. 14C shows the cross-section of tubular catalyst units arranged in a triangular pitch arrangement, each catalyst unit being of the type of FIG. 14A.

In case of the tubular catalyst units provided with fins, the units are arranged in the square or triangular pitch manner, by contacting them with each other through the fins, as shown in FIG. 13C or FIG. 14C. The radial length X and Y of the fins is given so that the respective equivalent diameters of the cross-section Si of the flow path inside the tubular catalyst units and the cross-section $Se_3$ or $Se_4$ of the flow path outside the units can be nearly equal.

The allowable range of the radial length of the fins X or Y is from 0.9 to 1.2 times the length in case where the respective equivalent diameters of the flow paths inside and outside of the tubular catalyst units are equal.

In the square pitch arrangement shown in FIG. 13C, the radial length X of fins making equal the above-mentioned equivalent diameters is given by the following equation:

$$X = \frac{-1 + \sqrt{1 + \{2(D_i/D_o)^2 + (\pi - 2)(D_i/D_o) + \pi - 4\}}}{2} \cdot D_o$$

The length X of fins making equal the equivalent diameters of Si and $Se_3$ varies depending upon the thickness of fins $t_1$ ($t_1 = (D_o - D_i)/2$), as seen in the following Table 1:

TABLE 1

| $D_i/D_o$ | 0.43 | 0.50 | 0.50 | 0.70 | 0.80 | 0.90 |
|---|---|---|---|---|---|---|
| $X/D_o$ | 0 | 0.05 | 0.13 | 0.20 | 0.27 | 0.34 |

X is generally selected from the values in the range of $0 < X \leq 10\, D_i$, taking dust-proof property into consideration.

In case where the tubular catalyst units are provided with fins having lengths given so that the equivalent diameters can be made equal and which are arranged in the square pitch manner, the flow rates of gas per the surface areas inside and outside the tubular catalyst units, are calculated as follows:

The equivalent diameter of the cross-section of the flow path formed outside the tubular catalyst units, $4R_{He}$, is expressed by the following equation:

$$4R_{He} = 4\left( \frac{(D_o + X)^2 - \frac{\pi}{4} D_o^2 - \frac{4 \cdot t_1 \cdot X}{2}}{\pi D_o + 4X - 4t_1} \right)$$

From this equation which gives $4R_{He} = D_i$, the length X of fins is sought.

When such a length X of fins is selected, the flow rates of gas, $V_i$ and $V_e$ in the flow paths inside and outside the tubular catalyst units become equal.

$$V_i/V_e = (D_i/4R_{He})^m, \quad 0.5 \leq m \leq 2.0$$

$$V_i = V_e$$

In this case, the flow rates of gas per the surface areas inside and outside the tubular catalyst units are as follows:

Flow rate of gas in the flow path inside the tubular catalyst units: $\pi/4\, D_i^2 V_i$ Surface area of the tubular catalyst units in the flow path inside the tubular catalyst units: $\pi D_i l$ Flow rate of gas per the said surface area:

$$\frac{\pi}{4} D_i^2 V_i / \pi D_i l = \frac{1}{4} D_i V_e / l$$

On the other hand,

Flow rate of gas in the flow path outside the tubular catalyst units:

$$\left( (D_o + X)^2 - \frac{\pi}{4} D_o^2 - 4\frac{4 \cdot t_1 \cdot X}{2} \right) V_e$$

Surface area of the tubular catalyst units in the flow path outside the tubular catalyst units: $(\pi D + 4X - 4t_1)l$ Flow rate of gas per the said surface area:

$$\left( (D_o + X)^2 - \frac{\pi}{4} D_o^2 - \frac{4 \cdot t_1 \cdot X}{2} \right) V_e / (\pi D + 4X - 4t_1)l$$

$$= \frac{D_i}{4} V_e / l$$

Thus, the flow rates of gas per the surface areas inside and outside the tubular catalyst units become equal. As a result, the percentage conversion in the inside and outside flow paths also become equal.

Next, in the triangular pitch arrangement shown in FIG. 14C, the length Y of the fins for making equal the equivalent diameters of the cross-sections of the inside and outside flow paths Si and $Se_4$ is given by the following equation:

$$Y = \left[ -\left(2\sqrt{3} - 3\right) + \sqrt{\left(2\sqrt{3} - 3\right)^2 + 2\sqrt{3}\left\{3(D_i/D_o)^2 + (\pi - 3)(D_i/D_o) - 2\sqrt{3} + \pi\right\}} \right] \cdot D_o/2\sqrt{3}$$

The length Y of the fins for making equal the equivalent diameters of the cross-sections of the flow paths $S_i$ and $S_{e4}$ varies depending upon the thickness of fins $t_2$ ($t_2 = (D_o - D_i)/2$), as shown in the following Table 2:

TABLE 2

| $D_i/D_o$ | 0.30 | 0.40 | 0.50 | 0.60 | 0.70 | 0.80 | 0.90 |
|---|---|---|---|---|---|---|---|
| $Y/D_o$ | 0 | 0.15 | 0.26 | 0.37 | 0.48 | 0.58 | 0.68 |

Y is generally selected from the values in the range of $0 < Y < 20\, D_i$, taking the dust-proof property into consideration.

If the above-mentioned arrangement of the catalyst units is taken, then, in the case of the triangular pitch arrangement, too as in the above-mentioned square pitch arrangement, the flow rates of gas and the flow amounts of gas per the surface areas of the tubular catalyst units in the flow paths inside and outside the tubular catalyst units become equal, respectively, and also the respective percentage conversion become equal.

We claim:

1. A catalytic reactor for reducing nitrogen oxide ($NO_X$) contained in exhaust gas, wherein a plurality of individual tubular catalyst units each being a ring shape in cross-section are disposed in the cross-section of the flow path of the exhaust gas in a manner that tubular axes thereof are in parallel with the direction of the gas flow within a reaction vessel through which the exhaust gas containing nitrogen oxide ($NO_X$) flows, constructed such that:

said catalyst units are disposed in spaced apart relationship from one another so that the respective equivalent diameters of the cross-sectional areas of the flow paths of gas formed inside and outside said tubular catalyst units per pitch of said tubular catalyst units are equal;

said catalyst units are disposed in a triangular pitch arrangement in the reaction vessel by wire stretching across a support frame in manner to form a rhombic mesh; and said support frame having supported thereon a plurality of wire nets of said rhombic mesh, wherein said plurality of wire nets are spaced in the direction of the gas flow in the reaction vessel in a manner to support at least the opposite end portions of the tubular catalyst units and wherein the size of the rhombic mesh is smaller than the outer diameter of the catalyst units whereby said tubular catalyst units are grasped thereby.

* * * * *